Figure 1:
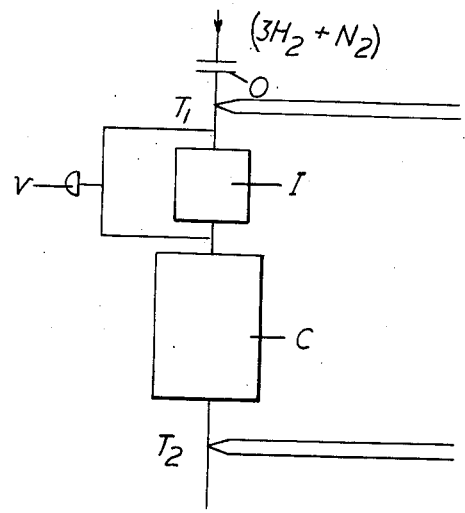

April 24, 1962    E. N. MARTIN ETAL    3,031,267
AUTOMATIC CONTROL AND OPERATION OF
CHEMICAL OR PHYSICAL PROCESSES
Filed Oct. 1, 1958                      3 Sheets-Sheet 1

SETTING OF INTERCHANGER BY-PASS VALVE

Inventors:
Ernest Norman Martin,
John Bartle, and
Charles Bernard Crowther,
By Cushman, Darby & Cushman
Attorneys.

Inventors:
Ernest Norman Martin,
John Bartle, and
Charles Bernard Crowther,
By Cushman, Darby & Cushman
Attorneys.

United States Patent Office 3,031,267
Patented Apr. 24, 1962

3,031,267
AUTOMATIC CONTROL AND OPERATION OF CHEMICAL OR PHYSICAL PROCESSES
Ernest Norman Martin, John Bartle, and Charles Bernard Crowther, all of Norton-on-Tees, England, assignors to Imperial Chemical Industries Limited, London, England, a corporation of Great Britain
Filed Oct. 1, 1958, Ser. No. 764,638
Claims priority, application Great Britain Oct. 2, 1957
20 Claims. (Cl. 23—198)

This invention relates to chemical or physical processes in which a variable such as temperature is important.

In processes, for example, in which heat is either evolved or absorbed, it is common to remove heat from or to supply it to the process by indirect heat transfer and to vary the rate of transfer in order to control the temperature as near as possible that which gives the highest efficiency in the process.

While of wide application, the present invention is especially valuable in its application to chemical processes in which the efficiency of make or output depends on working at the top or bottom of a curve relating certain process variables and in which a transducer such as a thermocouple can be employed to give signals which are an index of process efficiency. Instead of temperature there can be used other properties of the system such as pressure, concentration of a component in the feed mixture and in the reaction product; rate of flow of inlet and exit materials; or other variables which can be transduced.

Moreover, the aim may either be to pursue as closely as possible the peak of a curve having said property as ordinate, or to pursue the minimum of a curve having said property as ordinate, as when it is desired to operate with the most economic use of power.

According to the present invention in one embodiment there is provided in a chemical or physical process in which material is flowing or to which energy is supplied and in which a property which is transducible is important, a method of automatically conducting the process within a range of conditions near, preferably as near as possible, to those which give the greatest efficiency comprising: providing a transducer or transducers suitable for measurement of the specific property, forming part of a servo-controlled potentiometric circuit including an amplifying step, feeding the E.M.F. from the transducers to the said potentiometric circuit and comparing it therein at automatically timed intervals with the last previously determined corresponding E.M.F., employing the change in E.M.F., if such exists, to energize a sensing device operating one or the other of two electromagnets each provided with an armature and such that they drive in opposite direction, by a discrete amount, a cam situated on a shaft with which cam co-operates a follower initiating the operation of an element for sending a distance signal to a regulating unit varying the supply of the said material or energy to the process so as to increase or decrease by a discrete amount the quantity fed thereto per unit of time, and repeating the sequence of operations at timed intervals.

According to a further feature of the present invention there is provided in a chemical or physical process in which temperature is important and in which the supply of heat to or from the process is controlled by means of indirect heat transfer with a fluid, a method of automatically conducting the process within a range of temperature near, preferably as near as possible, to that which gives the greatest efficiency comprising: providing a transducer at the process inlet and another at the process outlet forming part of a servo-controlled potentiometric circuit including an amplifying step, feeding the E.M.F. from the transducers to the said potentiometric circuit and comparing it therein at automatically timed intervals with the last previously determined corresponding E.M.F., employing the change in E.M.F. if such exists to energize a sensing device operating one or the other of two electromagnets each provided with an armature and such that they drive in opposite directions, by a discrete amount, a cam situated on a shaft with which cam cooperates a follower initiating the operation of an element for sending a distance signal to a transducer operating a valve regulating the supply of the said fluid to the heat transfer means so as to increase or decrease by a discrete amount the quantity fed thereto per unit of time; and repeating the sequence of operations at timed intervals.

In this specification the process inlet is a point located just anterior to the process and such that substantially no change in the property chosen for measurement, e.g. temperature, has yet taken place resulting from the action of the process, and the process outlet as a point located ust posterior to the process and such that change in the said property resulting from the action of the process is substantially complete.

The transducers at the process inlet and outlet are preferably thermocouples. The sensing device may be a motor operated switch or a polarized relay, but the former is preferred because it affords simplicity by permitting the use of standard equipment and is less susceptible to stray signals.

Preferably the element sending the distance signal is a pneumatic transmitter which has the advantages of simplicity and robustness. Pneumatic operation of the valve controlling the fluid is quick acting and reliable.

The method includes as a preferred feature arranging, by the inclusion of a modified electrical network, that the pneumatic signal to the fluid valve never exceeds one step in the wrong direction, which is important when operating near a maximum or minimum.

The process is of especial value in the control of the ammonia synthesis. In this process synthesis gas, including a proportion of recycled exit gas from which ammonia has been condensed out, is fed to the converter in two streams of which the first is led directly to the converter through a heat interchanger and the second is fed to the converter through a heat interchanger located in the catalyst bed. The synthesis gas is thus itself the heat transfer fluid.

A suitable arrangement is shown schematically in FIGURE 1 of the accompanying drawings. The synthesis gas stream is metered by the orifice plate O to the converter C, and there are inlet and outlet thermocouples $T_1$ and $T_2$. Control over the exothermic reaction taking place in the converter C is exercised by automatic operation of the interchanger I by by-pass valve $v$. In broad principle the maximum amount of conversion takes place when $(T_2-T_1)$ is a maximum, where $(T_2-T_1)$ is the temperature difference due to the reaction. Minor corrections arise in practice because of heat losses and other factors.

Figure 2:
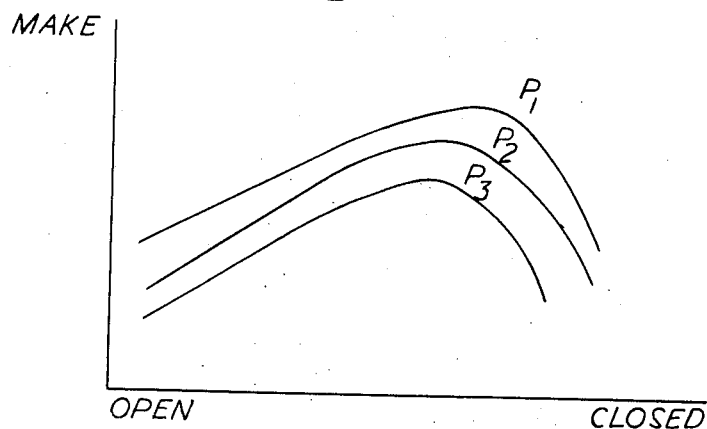

According to the present process the quantity $(T_2-T_1)$ is automatically maintained substantially at a maximum, and consequently the ammonia production at a given catalyst activity and a given feed gas make-up, is also maintained substantially at a maximum. In FIGURE 2 is shown illustratively a family of curves relating make of ammonia with the setting of the valve $v$. The family arises mainly through change in gas make-up, composition and rate, and/or catalyst activity. There are clearly maxima such as $P_1$, $P_2$ and $P_3$, and control according to the invention is automatically exercised to maintain $(T_2-T_1)$ substantially at the value $P_1$, $P_2$ or $P_3$ depending on the given operating conditions.

A form of apparatus will now be described which has been found to be well adapted for the automatic control of the ammonia synthesis. It comprises the following five elements in combination:

(a) A transducer, for example, two pairs of thermocouples connected in series opposition;

(b) A servo-operated potentiometric unit and "memory," e.g. of the "Brown" recorder type which has been modified by introducing an automatic switch controlling the operation of the motor;

(c) A sensing device capable of recognizing an increase (positive step) or a decrease (negative step) in efficiency;

(d) An automatic timer capable of variation to allow for the response-time of the plant (e.g., 1 to 30 minutes has been found suitable);

(e) An electro-pneumatic relay e.g. capable of affording a variation in air pressure of 3 to 15 p.s.i. in, for example, steps of ½ p.s.i. This may comprise a relay operated cam, coupled to an air transmitter of a known type, e.g. Foxboro.

Figure 3:
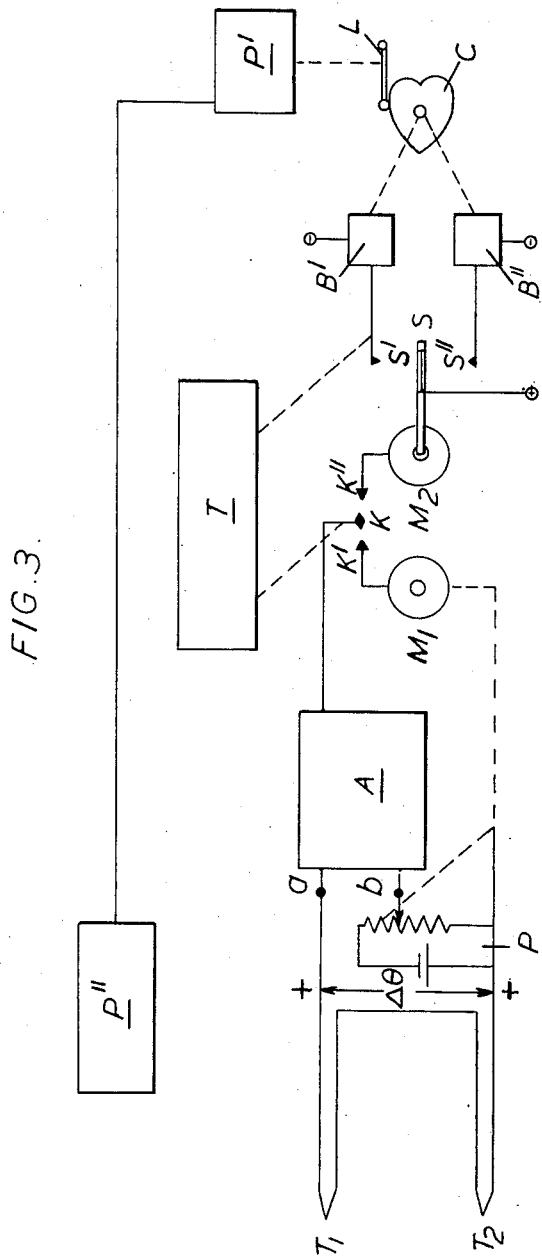

Such an apparatus, which will be referred to herein as an optimiser, is shown in FIGURE 3 of the accompanying drawings, which is a block schematic diagram. In this $T_1$ and $T_2$ represent the inlet and outlet thermocouples respectively; P is a potentiometric circuit; A is a phase sensitive amplifier; K', K, K'' is a relay operated 3-way switch, which is normally in the position K; T is the timer for initiating the optimiser; M1 is a two phase A.C. motor for operating the slide wire of the potentiometer; and M2 is a similar motor for operating the 2-way switch S'S'', S which has contacts S' and S''; B' is a clockwise drive magnet and B'' is an anticlockwise drive magnet, each adapted for driving the cam C one discrete step forward or backward; L is a mechanism such as a cam follower for operating the nozzle of the pneumatic transmitter P' with its mechanical transducer P'', which alters the setting of the by-pass valve in the line leading to the interchanger. It is convenient to use steps of ½ p.s.i. in the pneumatic transmitter for making the discrete alteration in the setting of the by-pass valve.

Operation of the ammonia synthesis process using the above-apparatus will now be described, assuming the maximum has not yet been reached. After rebalancing the potentiometer, a step change is made to the interchanger by-pass valve in a direction determined by the sensing device M2 immediately before the rebalancing. The process is then allowed to run for a time interval set by experience, and then the timer T causes the switch to move the contactor from K to K'', whereby a comparison of the instant value of the temperature difference $(T_2 - T_1)$ is made with the previous value retained by the memory. Depending on whether the new value of $(T_2 - T_1)$ is less than or greater than the previous value stored by the memory the switch S is moved, e.g. onto contact S'. This movement determines the direction of the next step. (For the present application, that is the ammonia synthesis, where the time interval between rebalancing and making the step change is small compared to the process response, the relative order of step changing and rebalancing steps is of no consequence and for practical convenience can be in fact reversed from this description.) The appropriate circuit including electromagnet B' is thus initiated for an interval set by the circuit design to cause the shaft to move the cam C clockwise by one step, thus increasing by ½ p.s.i. the pressure applied by the pneumatic transmitter P' to the mechanical transducer P'', which latter turns the by-pass valve to increase the gas flow through the interchanger.

If the maximum has been overshot, which is indicated by a decrease in $(T_2 - T_1)$ an automatic changeover switch to be hereinafter described comes into action and changes the electrical connections so that switch S moves to contact S'' and electromagnet B'' comes into action and causes the cam to move by a discrete step so as to decrease the amount of gas passing through the heat interchanger.

It is evident that the optimiser as described will go on increasing the efficiency until a further opening of the by-pass valve will cause a fall in the temperature difference $(T_2 - T_1)$.

In contrast to operation as just described, when the curve in consideration is of reversed curvature, that is a minimum value is sought after instead of a peak, e.g. power expenditure, then the minimum is sought by reversing the functions of S' and S''.

Figure 4:
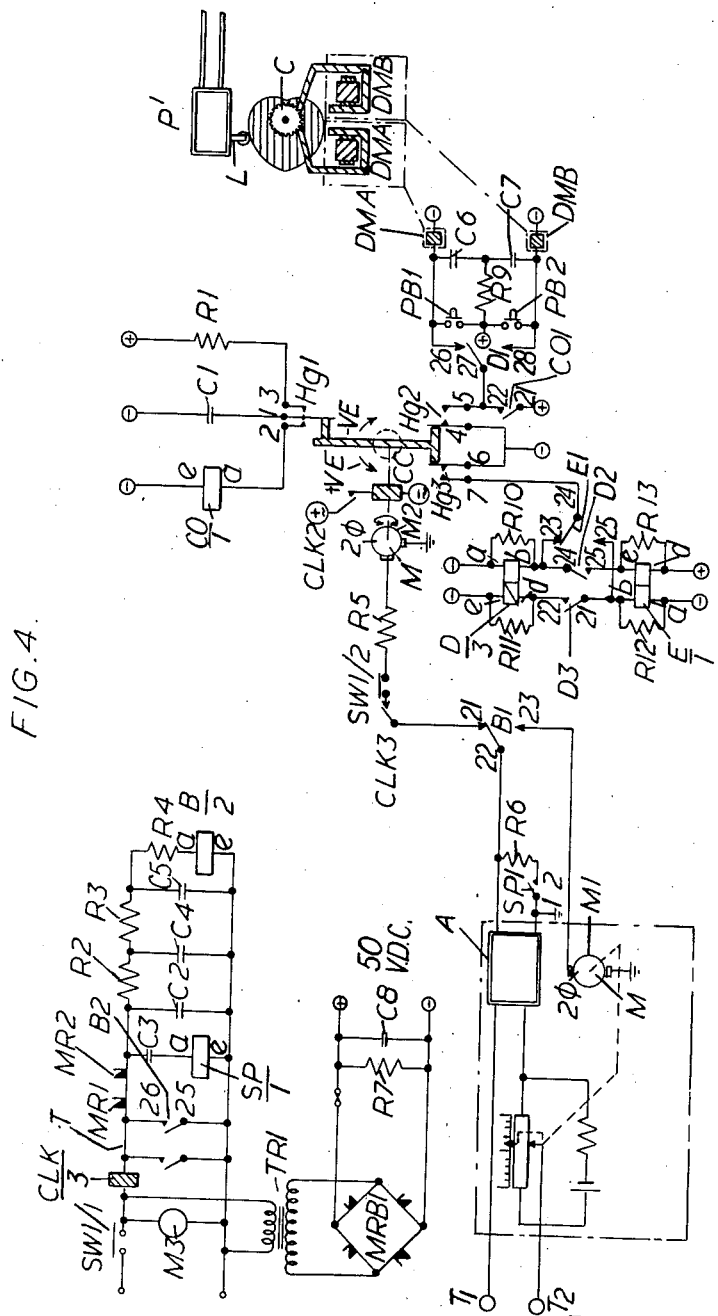

In FIGURE 4 the circuit diagram is given in detail and operation of the equipment will now be described in relation thereto. Operation on the positive step that is moving up to arrive at the maximum has already been described with reference to FIGURE 3.

If now the maximum corresponding to one of the peaks $P_1 P_2$ etc. has been reached, further opening of the by-pass valve will produce a fall in output, that is a negative step. When the timer has completed its cycle, the E.M.F. from the transducer will have fallen below the remembered potential set on the slide-wire at the previous step: there will be a reversal of phase of the amplifier output and this will initiate and determine the direction of rotation of the sensing motor M2. This closes switch Hg3, which may for example be of mercury type, immediately operating the relay solenoid D/3 in the two step relay circuit, all as later described in more detail, so changing the connections to the drive mechanism of the cam, and thus determining its direction of rotation. Simultaneously change-over switch Hg1 will charge condenser C1 via the switch terminals 1 and 3 and the surge limiting resistor R1. At the end of a prescribed time, say about 2 seconds, when the Hg switches are restored causing terminals 1 and 2 of Hg1 to be connected, C1 discharges through relay solenoid CO/1 closing contacts CO1 and rotating the cam drive mechanism. Thereupon the air pressure is decreased by ½ pound per sq. inch and this closes the interchanger valve a little, thereby starting increase in efficiency. Immediately thereafter the recorder automatically rebalances, and thus sets the new reference potential on the slide wire.

The repetitive timer T, which in FIGURE 4 is driven by the synchronous clock motor M3 should have a widely adjustable operating range and provide within this range two short fixed periods during which times either motor M1 or M2 are operative (e.g. 9 seconds and 2 seconds respectively). The timer shown has three separate pairs of contacts CLK1, CLK2 and CLK3 which are operated by a clock solenoid CLK/3 which when energized stays energized for a predetermined time, e.g. 1 to 30 minutes as preset to meet requirements desired. Two of these CLK2 and CLK3 make at zero position of the clock (i.e., when the armature of CLK/3 drops out after its preset time has elapsed), and one CLK1 breaks at zero.

On switching on the timer initially by closing SW1/1 manually for example, which also closes SW1/2, the clock motor M3 is started, but relay solenoids CLK/3 (without the full mains voltage across it) and B/2 are not immediately energized so contacts CLK1 and contacts B2 remain open and substantially the full mains voltage is across them. This voltage is rectified by MR1 and MR2, C2 being the reservoir condenser; C2, R2–C4 and R3–C5 form a time constant (of 2 seconds, in keeping with the example) and C5 charges against the leakage through R4 and relay solenoid B/2, which leakage is insufficient to operate relay B. Then for the before specified time of 2 seconds the output from the amplifier A is connected via contacts B1 (normal, i.e. points 21 and 22 connected while B/2 is de-energized), CLK3 (normal, i.e., closed while CLK/3 is de-energized) and the on/off switch SW1/2 made to the polarity sensing motor M2.

When the voltage across C5 is sufficient at the end of 2 seconds to operate relay solenoid B/2, contacts B1 change over so that points 22 and 23 are connected, and the amplifier output is connected via B1 operated, to the balancing motor M1 in the recorder. Contacts B2 operated (closed) due to the energization of relay solenoid B/2 completes a full voltage mains circuit to clock solenoid CLK/3, so starting a new time cycle with the closure of contacts CLK1 and the opening of contacts CLK2 and CLK3. Relay B remains operated until C5 discharges which in keeping with the example takes about 9 seconds, and thereupon solenoid B/2 becomes de-energized opening its contact B2 and switching its contact B1 to re-make a connection between points 21 and 22. The amplifier output is isolated from motor M2 as relay CLK has now operated and contacts CLK3 are open. The clock solenoid CLK/3 remains energized by the "hold-on" contacts CLK1 until such time as the clock relay CLK has completed its cycle and returned to the zero position.

To avoid an initial switching surge which could rotate motor M2 in such a direction as to indicate a change of $\Delta T$ of the incorrect sign and thus cause false operation of switches Hg1, Hg2 or Hg3, the relay solenoid SP/1 is connected in series with the capacitor C3 across the rectified D.C. output from MR2 in timer T. When the clock armature of relay CLK drops out at the zero position and CLK1 opens, relay SP operates momentarily during the charging time of C3. This is virtually instantaneous and contacts SP1 place resistance R6 in parallel with the amplifier output, which together with series resistor R5 decreases the surge during operation of CLK3, thus completing the supply to M2. There is a solenoid operated clutch CC between the sensing motor M2 and the switchplate housing Hg1, Hg2 and Hg3, the A.C. supply for the clutch solenoid being taken from the recorder supply via contacts CLK2 which, it will be recalled, close when the armature of relay clock CLK drops out upon reaching its zero position and open when the clock solenoid CLK/3 is reenergized. The clutch is therefore operated during the time constant period of approximately 2 seconds. When the clutch is disengaged the switch plate returns to its neutral position under the action of a spring loaded detent (not shown) causing terminals 1 and 2 of Hg1 to be re-connected and Hg2 and Hg3 to open.

Operation of the circuit providing the positive and negative steps relative to the maximum will now be described.

Firstly consider the situation when the optimising process is bringing the plant up to an optimum position and the peak on the "make" curve has not been over-run. The polarity sensing motor will operate the switch Hg2 (corresponding to the positive direction). A positive E.M.F. from terminal 4 is now extended via Hg2 operated, D1 normal (up, as shown), and the coils of drive magnet DMA to negative. DMA operates and rotates the cam C in such a direction as to cause the cam follower and lever L to increase the air output supply from the pneumatic transmitter and relay P' by ½ p.s.i. When Hg2 is restored to its normal open position upon the opening of contacts CLK2 after the required time (2 seconds) to effect energization of solenoid B/2, DMA releases. When relay B thus operates, the amplifier output is connected via contacts B1 operated to energize M1 which drives the potentiometer arm to set the new value $(T_2-T_1)$ in the potentiometric memory circuit. When the maximum point has been overshot from either direction, contacts Hg close and the two-step relay circuit comprising relays E and D (solenoids E/1 and D/3) is brought into operation in the manner now to be described, and thus the output air pressure from the device is increased or decreased by automatic selection of the correct drive magnet (DMA or DMB). This ensures that the plant requirements for a positive or negative step are achieved.

Next consider what happens when overshooting has taken place. Starting from the position shown in the circuit diagram, if a positive voltage is extended from terminal 6 via contacts Hg3 operated, E1 normal (up, as illustrated) and the coil connections $b$ and $a$ of relay solenoid D/3 to negative, relay D operates, immediately closing its contacts D2 and D3. Contacts D1 change over so as to connect points 27 and 28 and formulate a circuit for energizing the drive magnet DMB which is not actually energized until contacts CO1 are closed, contacts Hg2 being open at this time. Relay solenoid E/1 is not energized immediately either because there is a positive voltage applied to both sides of the right hand coil connections $e$ and $d$ and a negative to both sides of the left coil connections $a$ and $b$ of relay E. At the end of the positive pulse from Hg3, i.e. when Hg3 opens due to contacts CLK2 opening and the switch plates consequently returning to its neutral position, the right hand coil of relay solenoid E/1 operates in series with the right hand coil of relay solenoid D/3 (the circuit being from positive, coil connection $d$ and $e$ of relay E, contacts D2 made, coil connections $b$ and $a$ of relay D, to negative). During the time contacts Hg3 are closed, 1 and 3 terminals of contacts Hg1 are also connected, and capacitor C1 is charged from positive via Hg1. When the switch plate returns to its neutral position, Hg1 is restored so that its terminals 1 and 2 are connected and relay solenoid CO/1 is energised and operated for a short time by the discharge current of capacitor C1. Contacts CO1 extend a positive E.M.F. via contacts D1 operated to drive magnet DMB which in turn causes the air output supply from transducer-relay P' to decrease a discrete step, e.g., ½ p.s.i.

D and E remain operated until a further pulse is received from the terminal 6 positive supply via Hg3 (when closed again due to the sensing of a similar polarity temperature differential), E1 operated (down), D3 operated, coil connections $d$ and $e$ of relay D to the negative supply. As the coils of relay D are now energised in opposition, relay D drops out. Contacts D2 are arranged to open slightly before D3. At the same time changeover contacts D1 return to normal (up). Relay E is released when the positive E.M.F. supplied via Hg3 is broken by Hg3 returning to normal after remaining closed for about 2 seconds. Drive magnet DMA is now energized from a positive E.M.F. extended via contacts CO1 operated, D1 normal causing the air pressure from P' to increase by one discrete step such as ½ p.s.i.

High resistances R10, R11, R12 and R13 are connected in parallel with coils at relays E and D as shown in order to limit the inductive surge.

The condensers C6 and C7 in series with resistor R9 are connected between the positive supply and the positive side of the cam driving mechanism. Being thus in parallel with any pair of contacts between positive supply and the operating coils they serve to substantially eliminate any sparking at any of the contacts associated with breaking the circuit DMA and DMB.

The power supply is of conventional type and consists of a double wound transformer, a full wave bridge rectifier circuit, a regulation resistor R7 taking about 10% of the full load current, and a reservoir condenser C8.

Preferred forms of the process and apparatus according to the invention have been described above. But variants of a number of the elements may be used.

According to the invention in its broadest form, therefore, there is provided in a chemical or physical process in which material is flowing or to which energy is supplied and in which a property which is transducible is important, a method of automatically conducting the process within a range of conditions near to those which give the greatest efficiency comprising: providing a transducer or transducers suitable for measurement of the said property forming part of a servo-controlled potentiometric circuit including an amplifying step, feeding the E.M.F. from the transducer or transducers to the said potentiometric circuit and comparing it therein at automatically timed intervals with the last previously determined E.M.F., employing the change in E.M.F. if such exists to energise a sensing device which initiates the operation, in a positive or negative sense as required by the sense of the said change in E.M.F. of a transducing system for directing in an appropriate sense a regulating unit for varying by a discrete amount the quantity of material or energy fed per unit of time and repeating the sequence of operations at timed intervals.

The composite switch Hg1, Hg2, Hg3 designated as a polarity sensing output switch, preferably comprises mercury switches, but may also comprise relay contacts or any other form of mechanical switching, e.g. micro switches.

Alternatively the transducing system may be pneumatically operated. For example, the cam may be adapted for operation clockwise or anticlockwise by one or other of two pneumatic cylinders through ratchets. The impulse for each of these cylinders is provided from a constant pressure air supply by separate solenoid operated valves each provided with an exhaust line. The cylinders are provided with springs for returning the pistons to their rest positions. The sensing device directs a two-way electrical switch which initiates the appropriate solenoid for rotating the cam by a discrete amount.

A further example of a suitable transducing system is as follows. A split field electric motor operates a shaft which can be connected through a mechanical clutch to a cam. There is a radial switch connected to the shaft between the motor and the clutch and constrained to move between two stops. The switch as directed by the current through the motor coil moves a discrete amount to close a circuit energizing an electro-magnetic element for operating the clutch and also for disconnecting the power supply to the split phase motor. When the cam has moved the discrete step the clutch is disengaged, the coil of the split field motor is deenergized, the motor shaft returns to its original position, but the cam remains in the new position.

In some applications, for example where concentration or pressure is important, one transducer is sufficient. Where temperature is the important property resistance thermometers may be used instead of thermocouples; where pressure is the important property there may be used, for example, a diaphragm in combination with strain gauges forming a bridge circuit, or a Bourdon pressure element in combination with a transmitting potentiometer. Where flow is the important property flow meters may be used; where concentration of a given substance is important an analyzer such as a conductivity meter, a pH meter, or an infra-red spectrometer, may be used; and where the process involves supply of energy a wattmeter may be used.

We claim:
1. Apparatus for automatically continually optimising the efficiency of a chemical or physical process variable in efficiency by changing at least one condition, transducer means for measuring said condition and providing an E.M.F. related thereto at the instant of measurement, memory means for remembering an instant E.M.F. so provided and changeable from time to time to remember, respectively, later E.M.F.'s so provided, means for comparing at given times an instant E.M.F. with the last previously remembered E.M.F. to provide an output, if at all, of one sense or another according to whether the compared instant E.M.F. was more or less than the then remembered E.M.F., control means for varying said condition in a single step by a fixed discrete amount once for each of a plurality of cycles and in a positive or negative sense according to the sense of said output and means, including cyclic timing means for effecting said cycles, for causing the memory means and control means to vary said condition as aforesaid at another time during each cycle and for preventing during another part of each cycle either the operation of the control means or any change in the memory means as to the E.M.F. then remembered.

2. Apparatus as in claim 1 including a regulating unit for controlling the supply of a quantity involving in said process, a transducing system including a cam and follower and two electro-magnets each provided with an armature and adapted when energized to drive said cam in opposite directions by a discrete amount, and means coupling the follower to said regulating unit for controlling the latter in discrete amounts, and a sensing device operable to determine the sense of the output of said comparing means for controlling said transducing system by operating one or the other of said electro-magnets to provide a discrete change in the supply of said quantity in one direction or the other in accordance with the sense of the output of the comparing means.

3. Apparatus as in claim 1 wherein the condition being measured is temperature and said transducer means includes at least one heat sensitive device.

4. Apparatus as in claim 3 including a second heat sensitive device for providing a differential temperature related to the heat transfer occurring in said process.

5. Apparatus as in claim 1 wherein the control means includes a sensing device, a transducing system coupled thereto, and a regulating unit operable by the output of said transducing system for controlling said condition, said sensing device including means operable to cause the transducing system and the regulating unit to be operated in the same manner as after the last previous comparison when a given comparison shows that the new value of the said E.M.F. is greater than the last previously determined value thereof.

6. Apparatus as in claim 1 wherein the control means includes means for causing said condition to change away from a maximum efficiency point following a variation in the condition which causes the optimum state of the process to be overshot, and includes means for causing the condition to be returned toward the optimum state therefor after the next comparison, thereby effecting an improvement in the efficiency of the process.

7. Apparatus as in claim 1 wherein said control means includes a sensing device, a transducing system, a regulating unit, and means associated with the sensing device for causing initiation of the operation of the transducing system and the regulating unit in the same manner as at the last previous comparison when the last previous movement of the regulating unit has caused said condition to be changed in such a manner that the optimum thereof for the process is overshot, and for causing an initiation of the transducing system in the opposite sense on the next comparison whereby the regulating unit is caused to move in such manner that the efficiency of the process tends to improve.

8. Apparatus as in claim 1 wherein said control means includes a sensing device, a transducing system, a regulating unit and means associated with the sensing device for initiating operation of the transducing system in a manner opposed to that which took place after the last previous comparison when a new comparison shows that the new value of the E.M.F. is less than the last previously determined value, thereby causing the regulating unit also to be directed in an opposing manner whereby the efficiency of the process tends to improve.

9. Apparatus as in claim 1 wherein said control means includes a sensing device and a transducing system for controlling said condition, and further including a polarity sensing output switch between said sensing device and transducing system for initiating the transducing system in the sense determined by the output of the comparison means as sensed by the sensing device.

10. Apparatus as in claim 9 in which the polarity sensing output switch initiates and regulates three circuits of which one comprises the transducing system, the second serves for changing the sense of the output of the transducing system when this is required, and the third serves to initiate the operation of the transducing system after the sense of the latter has been altered.

11. Apparatus as in claim 10 in which the transducing system includes two subcircuits each operating an electromagnet, a subcircuit control switch, and an auxiliary switch operated only when a change of sense in the transducing system is required.

12. Apparatus as in claim 10 in which the second circuit comprises two double wound electro-magnetic relays and their associated sets of contacts arranged so that on initiation of the second circuit the first of the said relays does not operate but the second operates to cause two sets of contacts associated with it, and to change the control switch of the subcircuits of the transducing system, and at the end of initiation of the first relay operates in series with the second relay to leave the circuit in its condition for the next cycle.

13. Apparatus as in claim 11 in which the third circuit comprises a resistance, a capacitor, a relay for operating said auxiliary switch when required, the arrangement being such that when the third circuit is closed the capacitor is charged and when the third circuit is opened, the capacitor is discharged through the relay and the latter operates said auxiliary switch.

14. Apparatus as in claim 1 wherein said cyclic timing means comprises a solenoid clock having a plurality of contacts, a relay for initiating the operation of said clock and for controlling said control means, a second relay with an associated capacitor for operating an anti-surge device following said comparing means, and two time constant circuits defining the operating times for said memory means and control means.

15. Apparatus as in claim 1 wherein said memory means includes a servo controlled potentiometric circuit, and wherein the comparing means includes an amplifier, said control means including a sensing device to which the output of the amplifier is fed at timed intervals, a transducing system which is initiated by said sensing device, and a regulating unit responsive to the output of the transducing system for varying the amount of a quantity fed to the process per unit of time for controlling said condition.

16. A method of operating the ammonia synthesis which comprises feeding a synthesis gas comprising nitrogen and hydrogen in two streams of which the first is led directly to a reaction zone via indirect heat interchange and the second is led to the synthesis zone via indirect heat inter-change located in the catalyst bed, effecting the reaction catalytically, and optimising the synthesis by measuring the difference in temperature between the feed gas and the exit gas from the reaction zone at timed intervals, transducing this measurement into an E.M.F. and automatically comparing it potentiometrically with the last previous E.M.F. similarly obtained, amplifying the resulting difference in E.M.F. electronically, if there is one, subjecting the resulting E.M.F. to polarity sensing, using the output therefrom to initiate any of three circuits dominating a posterior transduction, one of which the first operates said transduction, when the sense of the output from the sensing means is in the same sense as when the last measurement was made, the second changes the sense of the output of the transduction when this is required, and the third initiates the transduction after its sense has been altered, whereby the transduction is effected suitably, and using the transduced output to alter in a single step by a discrete fixed amount the volume of gas passing through the first heat interchange per unit of time.

17. Apparatus for automatically optimising the efficiency of a chemical or physical process variable in efficiency by changing at least one condition, which comprises in combination; at least one transducer for measuring said condition and for providing an E.M.F. directly related to that meaesurement which forms part of a servo-controlled electrical circuit including a potentiometric memory and an electronic amplifier, a polarity sensing switch to which the output from the amplifier is fed and which is adapted for connection automatically to any of three electrical circuits of which the first serves to operate a posterior transducing system and does so if the output from the said switch is in the same sense as when the last measurement was made, the second serves to change the sense of the output of the transducing system when this is required, and the third serves to initiate the transducing system after the sense of the latter has been altered, a regulating unit operated by the said transducing system for varying, in a single step by a fixed discrete amount only, the said condition, and an automatic timer, the arrangement being such that at predetermined intervals only, which are set by the timer, the following sequence occurs automatically, the E.M.F. from the transducer is compared in the memory unit with the last previously determined E.M.F. and if there is a change this change energises the polarity sensing output switch which in turn initiates operation of the said circuits and the transducing system, whereby the regulating unit varies the said condition in a single step by a discrete fixed amount.

18. Apparatus as in claim 17 in which the transducing system includes two sub-circuits each operating an electro-magnet, a sub-circuit control switch and an auxiliary switch only operated when a change of sense in the transducing system is required.

19. Apparatus as in claim 18 in which the said second circuit comprises two double wound electro-magnetic relays and their associated sets of contacts arranged so that on initiation of this circuit the first relay does not immediately operate and the second operates to close two sets of contacts associated with it, and to change the control switch of the sub-circuits of the transducing system; and at the end of initiation the first relay operates in series with the second relay to leave the circuit in condition for the next cycle.

20. Apparatus as in claim 19 in which the said third circuit comprises a resistance, a capacitor, and a relay for operating the auxiliary switch of the transducing system when required arranged so that when this circuit is closed the capacitor is charged and when the circuit is opened the capacitor is discharged through the relay and the latter operates the said auxiliary switch.

References Cited in the file of this patent
UNITED STATES PATENTS

| | | |
|---|---|---|
| 1,969,536 | Winne | Aug. 7, 1934 |
| 2,285,540 | Stein | June 9, 1942 |
| 2,312,711 | Harrison | Mar. 2, 1943 |
| 2,590,436 | Luten | Mar. 25, 1952 |
| 2,765,219 | Shawhan | Oct. 2, 1956 |
| 2,800,399 | King | July 23, 1957 |
| 2,890,617 | Lupfer | June 16, 1959 |
| 2,909,413 | Hildegard | Oct. 20, 1959 |